United States Patent [19]

Scott

[11] 3,796,121
[45] Mar. 12, 1974

[54] METHOD OF AND APPARATUS FOR LOCATING SHEETS OF OPEN-CELLED RETICULAR MATERIAL

[75] Inventor: Joseph James Scott, Newtownards, Northern Ireland

[73] Assignee: Short Brothers and Harland Limited, Belfast, Northern Ireland

[22] Filed: Dec. 2, 1971

[21] Appl. No.: 204,090

[30] Foreign Application Priority Data
Dec. 2, 1970 Great Britain.................. 57,323/70

[52] U.S. Cl....................... 83/451, 83/562, 83/660, 156/513, 269/54.5
[51] Int. Cl................................................ B26f 1/24
[58] Field of Search........... 83/2, 30, 374, 451, 660, 83/562; 156/513, 253; 269/54.5

[56] References Cited
UNITED STATES PATENTS
2,355,454  8/1944  Lucius..................................... 83/2

Primary Examiner—J. M. Meister
Attorney, Agent, or Firm—Cushman, Darby & Cushman

[57] ABSTRACT

An apparatus for constructing a composite structure including a sheet of open celled reticular material, comprising a jig including a base and a plurality of lateral rows of projecting members each row of which is restrained against movement relative to the base in the lateral direction but is individually capable of a degree of movement in the longitudinal direction so as to enable a sheet with non-uniform or irregular cell pitch dimensions to be located on the base and a piercing assembly for alignment with the cells of the material for piercing a sheet of thermoplastic adhesive covering the ends of the cells of the material, for piercing the adhesive substantially in the center of each cell.

13 Claims, 7 Drawing Figures

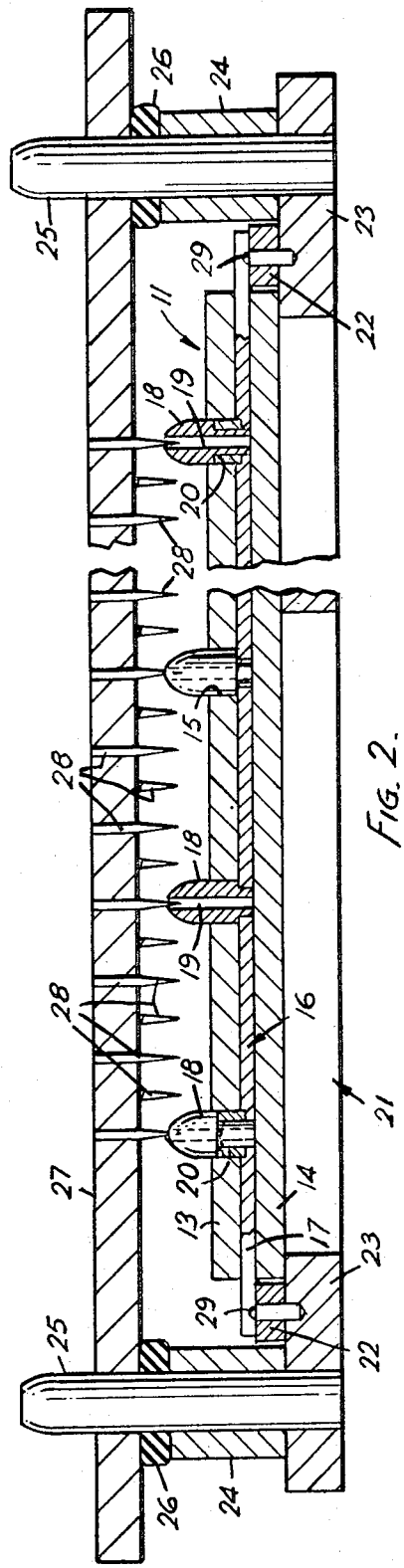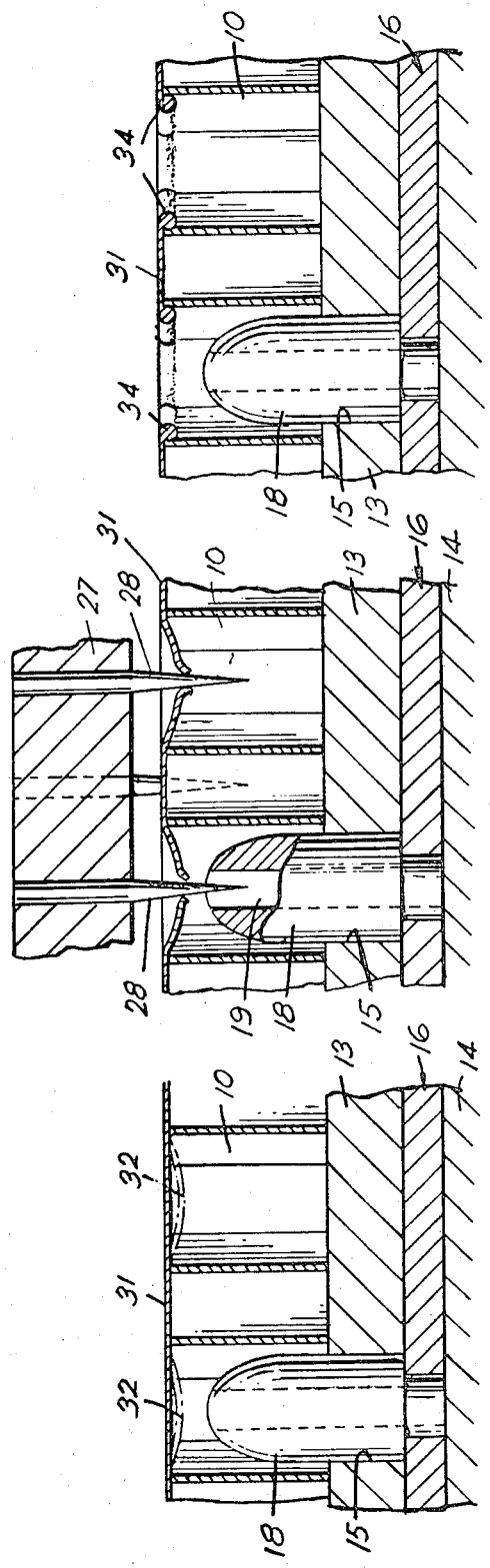

METHOD OF AND APPARATUS FOR LOCATING SHEETS OF OPEN-CELLED RETICULAR MATERIAL

The invention relates to a method of and apparatus for locating sheets of open-celled reticular material in a manner which allows for a certain degree of irregularity of cell pitch dimension over the area of the sheet.

The need for location of a sheet of reticular material arises, for example, in the manufacture of a composite structure for noise attenuating purposes in which the sheet forms an intermediate cellular core and is sandwiched between two facing sheets, one of which is perforated to enable the cell to exercise the greatest attenuating influence on impinging soundwaves. In normal composite structures, with both facing sheets unperforated there is no need to reticulate the adhesive film (used to bond the core to the facing sheets), and thus cause it to adhere only at the edges of the cells of the core, this becomes essential for noise attenuating panels with a perforated facing sheets since it is desirable that the minimum number of holes of cell ends become blocked.

Piercing of the adhesive film to aid the process of reticulation can, for example, be achieved by a series of pins which move relative to the sheet so that each pin can be made to project into a corresponding cell to pierce the adhesive film stretched across the otherwise open ends of the cell, after which the adhesive draws back from the pierced hole to form localised beads along the attachment faces of the cellular core material.

It will be appreciated that for this piercing operation to be effected successfully, with the pins passing generally centrally into the cell recesses, the positioning of the pins must be correlated with the positioning of the cell recesses. Sheets of open celled reticular material are manufactured with the centres of the cells in a nominally regular array. However, due to manufacturing tolerances, the cells are often of non-uniform or irregular dimensions in both a longitudinal direction and a lateral direction.

It is an object of the invention to provide a method and apparatus whereby the cells of the sheet of open-celled reticular material can be correlated with the pins.

According to one aspect of the invention, therefore, there is provided a method of locating a sheet of open-celled reticular material on a jig comprising placing the material on the jig so that each projecting member of each row of a plurality of lateral rows of projecting members extends into a corresponding cell of the material, each of the plurality of lateral rows of members projecting from a base of the jig and being restrained against movement relatively to the base in the lateral direction but being individually capable of a degree of movement in the longitudinal direction so as to enable a sheet with non-uniform or irregular cell pitch dimensions to be located on the base.

According to a second aspect of the invention, there is provided an apparatus for locating a sheet of open-celled reticular material, comprising a jig including a base and a plurality of lateral rows of projecting members each of which is restrained against movement relative to the base in the lateral direction but is individually capable of a degree of movement in the longitudinal direction so as to enable a sheet with non-uniform or irregular cell pitch dimensions to be located on the base.

The invention also includes within its scope a method of constructing a composite structure comprising locating a sheet of open-celled reticular material on a jig by the method according to the first aspect of the invention and further comprising the steps of covering the ends of a plurality of the cells of the material with a sheet of thermoplastic adhesive, piercing the adhesive covering each cell substantially in the centre of each cell with piercing members aligned with the centres of the cells of the material, heating the adhesive to cause reticulation thereof to form a bead of adhesive around the end edges of each cell, and finally adhering a facing sheet to the material by said bead of adhesive.

The invention further includes within its scope an arrangement for constructing a composite structure comprising an apparatus for locating a sheet of open-celled reticular material according to the second aspect of the invention and further including a piercing assembly for alignment with the cells of the material to pierce a sheet of thermoplastic material covering the ends of a plurality of cells of material.

The following is a more detailed description of two embodiments of the invention, by way of example, reference being made to the accompanying drawings in which:

FIG. 2 is a cross section on the line 2—2 of FIG. 1;

Figure 1:
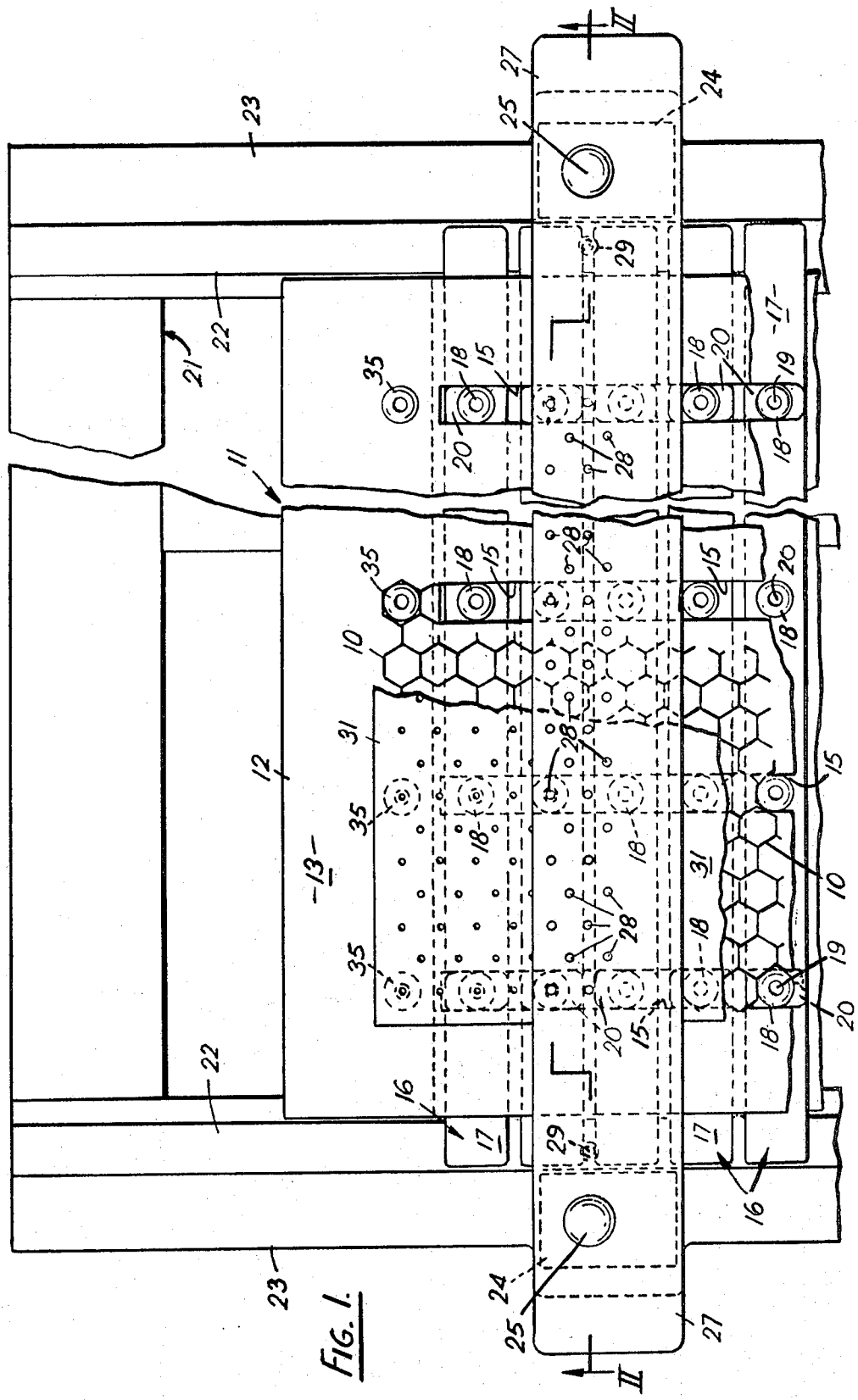
FIG. 1 is a partial plan view of a first arrangement for constructing a composite structure, partially broken away.
Figure 6:
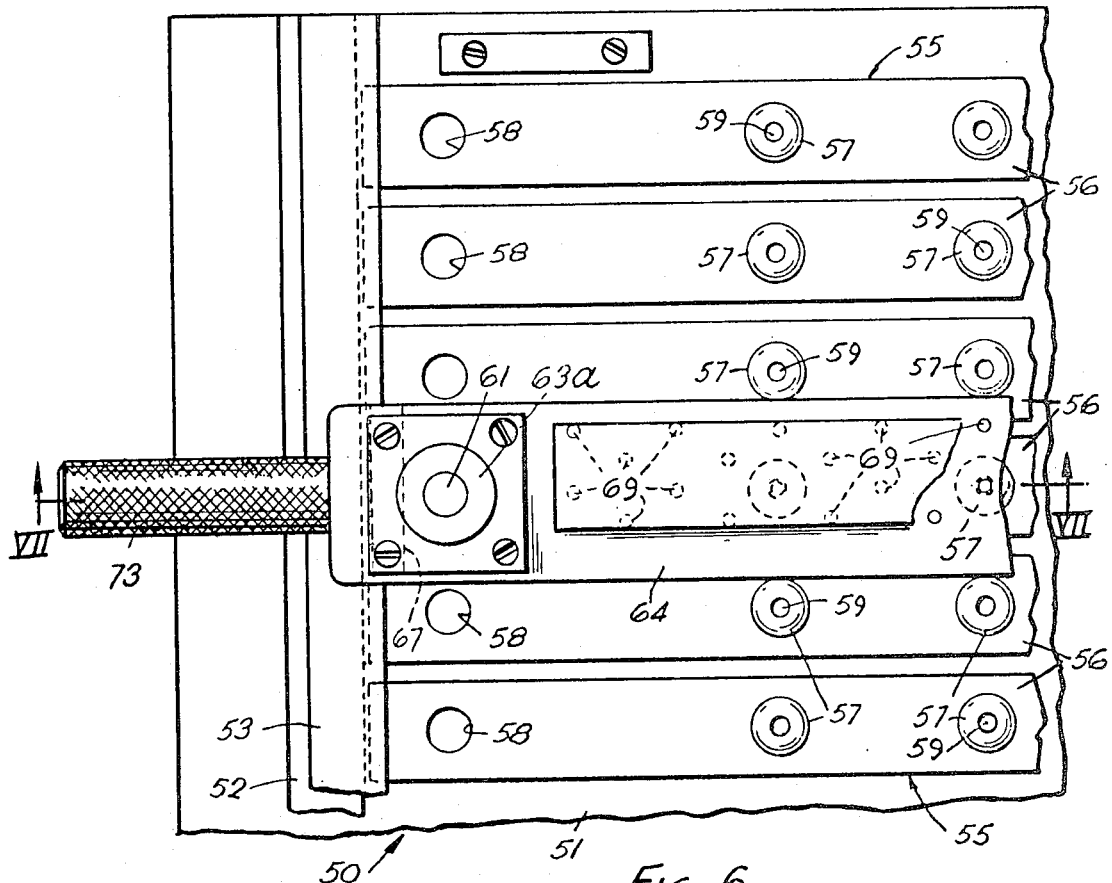
Figure 7:
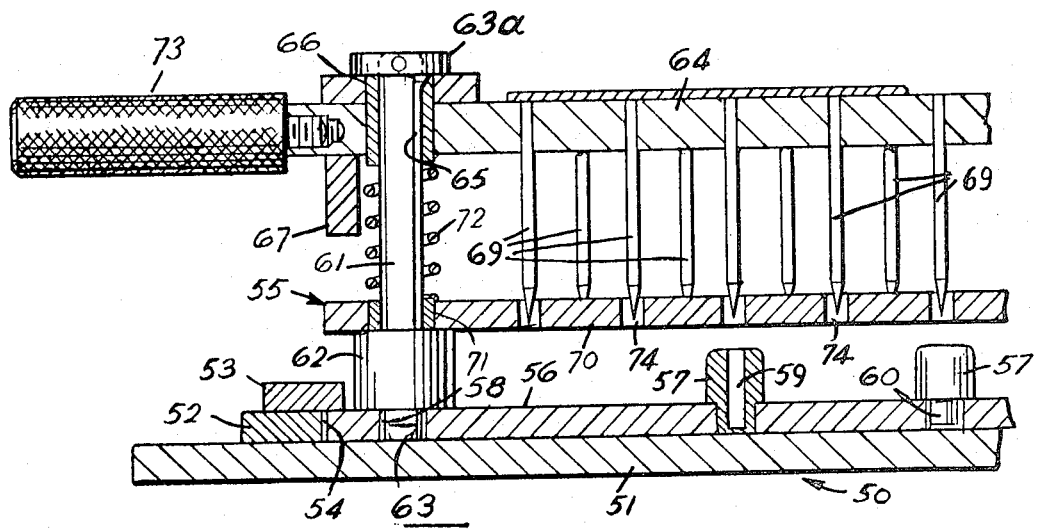

FIG. 3 if a fragmentary view illustrating a first stage in a method of constructing a composite structure using the arrangement of FIGS. 1 and 2;

FIG. 4 is a view similar to FIG. 3 illustrating a second stage in the method of construction;

FIG. 5 is a view similar to FIGS. 3 and 4 illustrating a third stage in the method of construction;

FIG. 6 is a partial plan view of a second arrangement for constructing a composite structure; and FIG. 7 is a cross section on the line VII—VII of FIG. 6.

Referring first to FIGS. 1–5, the first arrangement for constructing a composite structure comprises an apparatus for locating a sheet 10 of open celled reticular material including a jig 11 and flat rectangular base 12.

The base 12 comprises a pair of parallel but spaced boards 13, 14 (as best seen in FIG. 2) which are connected together at their ends. The upper board 13 is provided with six parallel longitudinally extending slots 15 (four of which are seen in FIG. 1) which lead into the space between the two boards 13, 14.

A plurality of rows of projecting members 16 extend across the jig 11. Each row of projecting members 16 comprises a bar 17 which has six projecting members 18 spaced apart with regular pitch along its length so that each projecting member 18 extends through a corresponding one of the slots 15 of the upper board 13. The projecting members 18 are formed as substantially cylindrical pegs with an axial hole 19 extending therethrough. In addition, the two outer projecting members 18 of each row of projecting members 16 are each mounted on a corresponding rectangular spigot 20 which is a sliding fit within its corresponding slot 15. In this way, the rows of projecting members 17 are restrained against movement relative to the base 12 in the lateral direction but are individually capable of a degree of movement in the longitudinal direction.

The ends of the bar 17 extend beyond the edges of the base 12.

A row of fixed projections in the form of fixed pegs 35 are provided at one end of the base 12 with the pitch of the pegs 35 being the same as the pitch of the projecting members 18 on the rows of projecting members 16.

The jig 11 is mounted on a piercing assembly 21 with the longitudinally extending edges of the lower board 14 abutting a pair of parallel guides 22, as best seen in FIG. 2. The guides are mounted on the longitudinal members 23 of the rectangular framework of the piercing assembly 21.

A block 24 is mounted in a corresponding position on each longitudinal framework member 23 and a vertical post 25 extends through each block 24 and terminates at its lower end in a longitudinal member 23. The upper end of each post 25 extends clear of its corresponding block 24 and is encircled by a rubber grommit 26 which seats on the associated block 24.

A beam 27 extends between the two posts 25 with a hole at each end of the beam 27 being a sliding fit on a corresponding one of the posts 25. A plurality of piercing members in the form of pins 28 extend through the beam 27 (as best seen in FIG. 2) and are arranged on its lower surface in four rows at a pitch which corresponds to the nominal pitch of the centres of the cells of the material 10.

The ends of the bars 17 lie on the upper surfaces of the two guides 22. A releasable detent in the form of a spring loaded ball 29 extends from the surface of each guide 22 in fixed relation to a datum row of pins 28 (as seen in FIG. 2). The balls 29 extend between the side faces of ends of two adjacent bars 17 to hold the jig 11 relatively to the piercing assembly 21. The springs urging the balls 29 are arranged so that a suitable force applied to the end of the jig parallel to the two guides 22 will cause the balls 29 to retract and permit movement of the jig 11 in a longitudinal direction between the guides 22.

Sheets of open celled reticular material are manufactured with the centres of the cells in a nominally regular array. However, due to manufacturing tolerances, the cells are often of non-uniform or irregular dimensions in both a longitudinal direction and a lateral direction. Thus, the pitch of the cells can vary across the width of a sheet of material and may be of the order of 0.02 inches per cell. The jig 11 is used to locate the cells of the material 10 on the base 12 as described below.

The cells of the sheet of material 10 are placed on the jig 11 so that each projecting member 18 of a row of projecting members 16 extends into a corresponding cell of the material 10. Where necessary, the bars 17 are slid in a longitudinal direction to accomodate cell irregularities. In this way, the pitch of the cells of the material 10 in a lateral direction is held constant since the projecting members 18 on the row of projecting members 16 are at a constant pitch. The material 10 is, therefore, left with irregularities in a longitudinal direction only.

With the cells of the material 10 located on the jig 11, the material is used to construct a composite structure as follows: a non-perforated self-supporting thermoplastic adhesive sheet 31 is laid over the upper face of the sheet of material 10 to cover the ends of the cells.

The sheet 31 is then subjected to a predetermined elevated temperature for a short period of time which causes the adhesive to adhere slightly to the end edges of the cells of the material 10 and to drape into each cell of the material 10 as shown in chain dotted lines at 32 in FIG. 3. The adhesive is allowed to cool.

The beam 27 is then raised on the posts 25 and the jig 11 is inserted between the guides 22 on the piercing assembly 21. When the first bar 17 abuts the balls 29, movement of the jig is halted and the beam 27 lowered on the pegs 25. The jig 11 is thus held in a position in which the pins 28 are aligned within predetermined acceptable tolerances with the centres of four lateral rows of cells of the sheet of material 10, since the position of each bar 17, and the gap between adjacent pairs of bars 17, is representative of the irregularity on a longitudinal direction of the cells engaging with the projecting members of the bar 17. Thus engagement of the balls 29 between adjacent bars 17 ensures tthat the lateral row of cells actually in alignment with the datum row of pins 28 are most correctly aligned with the pins and the maximum misalignment is in the two lateral rows of cells which are in engagement with the projecting members 18.

The downward movement of the beam 27 causes the pins to pierce the adhesive film in the centre of each cell, as shown in FIG. 4, with those pins 28 which enter cells containing a locating member 18 entering the axial holes 20 formed therein.

With the beam 27 in the raised position, the jig 11 is moved forward in a step to override the balls 29 until the balls can engage with the gap formed between the first and second bars 17. Thus the pins 28 are aligned with the cells of the next four lateral rows of cells in accordance with the irregularities of these rows. The piercing operation is then repeated and the jig moved in further steps at each of which a piercing operation takes place until all the cells covered by adhesive have been pierced.

The adhesive sheet 31 is then reticulated to the end edges of the cells of the material 10 by subjecting the adhesive sheet 31 to further heating which causes the adhesive to draw back from the pierced holes 33 and formed localised beads 34 around the end edges of each cell. The material 10 is then removed from the jig 10 and a perforated facing sheet (which is not shown) is adhered to the material by the beads 34 of adhesive to form one face of a sandwich panel. Simultaneously or separately a backing sheet is bonded to the opposite side thereof to form a composite sound absorbing sandwich panel.

Referring next to FIGS. 6 and 7, a second arrangement for constructing a composite structure comprises an apparatus for locating a sheet of open celled reticular material comprising a jig 50 having a flat rectangular base 51.

The base 51 has mounted thereon a pair of parallel members 52, each of each carries an associated member 53 to farm longitudinally extending side facing slots 54, as best seen in FIG. 7. A plurality of rows of projecting members 55 extend between the slots 54 and each row of projecting members 55 comprises a rectangular bar 56 whose square ends are guided in the slots to restrain the row of projecting members 55 against movement relatively to the base 51 in the lateral direction but allow the rows of projecting members 55 a degree of movement in the longitudinal direction. Each bar 56 carries 5 projecting members in the form of pegs 57 which are spaced apart along the bar with regular pitch. In addition, each bar 56 is provided with a pair of locating holes 58, as best seen in FIG. 7 towards the ends thereof for a purpose hereinafter described.

Each peg 57 is circular in cross section and includes an axially extending bore 59, as also shown in FIG. 7. The pegs 57 are provided with a portion 60 of smaller diameter by which they are fixed on the bar 56.

With reference to FIG. 7, a piercing assembly comprises a pair of parallel posts, one of which is shown at 61. Each post 61 has a corresponding lower stop 62 mounted at its lower end with a locating spigot 63 extending from the lower stop 62. The upper end of each post 61 carries a fixed upper stop 63a.

A piercing head in the form of a beam 64 extends between the two posts 61 with each post 61 extending through an associated hole 65 at one end of the beam 64 with the hole 65 lined with a bush 66. The ends of the beam 64 beyond the posts 61 each carry a corresponding fixed stop 67 for a purpose hereinafter defined. The portion of the beam 64 between the two posts 61 carries four rows of pins 69 arranged at a pitch which corresponds to the nominal pitch of the centres of cells of a sheet of open-celled reticular material (not shown).

In the position shown in FIG. 7, the sharpened points of the pins 69 each lie within a corresponding hole 74 of a perforated plate 70. Each end of the perforated plate 70 is provided with a corresponding bush 71 which encircles a corresponding post 61 to allow each end of the perforated plate 70 to rest against the lower stop 62.

A helical spring 72 surrounds each post 61 and urges the plate 70 against the lower stop 62 and the beam 64 against the upper stop 63a. The ends of the beams 64 are each provided with an associated knurled handle 73.

In use, a sheet of open celled reticular material (not shown) whose cell pitch dimensions are non-uniform or irregular is placed on the jig so that each projecting member 57 of the rows of projecting members 55 extends into a corresponding cell of the material. Due to the regular lateral pitch of the projecting members 57, the lateral pitch of the cells is immediately fixed and the irregularities are confined to a longitudinal direction only.

With the sheet of material so arranged on the jig 11, a sheet of adhesive (not shown) is placed over the ends of the cells and heated, as described above with reference to FIG. 3. The piercing assembly is then positioned with the locating spigots 63 of the posts 61 on the pair of locating holes 58 of a row of projecting members 55. Since each bar 56 is in a position which is representative of the irregularity in a longitudinal direction of cells of the material located on the projecting members 57 of the bar 56, one lateral row of pins 69 will be exactly aligned with that lateral row of cells which are located on the projecting members 57 of the bar 56 on which the piercing assembly is mounted. The pins 69 of the remaining three lateral rows of pins are only slightly out of alignment with the rows of cells above which they are arranged.

The handles 73 are depressed against the action of the spring 72 to cause the pins 69 to pass through the holes 74 in the plate 70 and pierce the sheet of adhesive as described above with reference to FIG. 4. Those pins entering cells containing pegs 57 pass into the axial bores 59. The downward movement of the beam 64 is limited by the stop 67 which abuts the plate 70 after a predetermined downward movement.

The piercing assembly is then moved to engage the locating lugs 63 in the locating holes 58 of an adjacent row of projecting members 55 and the piercing operation repeated. Since the position of this row of projecting members 55 is also representative of the irregularity in a longitudinal direction of its row of cells of the material, correct alignment of the cells and pins will be obtained. In this way all the adhesive covering cells of the material is pierced.

After piercing, the adhesive is heated for a second time to reticulate the adhesive into beads, as described above with reference to FIG. 5, and facing sheets are attached, as described above with reference to FIGS. 1 to 5.

I claim:

1. An apparatus for constructing a composite structure including a sheet of open celled reticular material, comprising a jig including a base and a plurality of lateral rows of projecting members each row of which is restrained against movement relative to the base in the lateral direction but is individually capable of a degree of movement in the longitudinal direction so as to enable a sheet with non-uniform or irregular cell pitch dimensions to be located on the base and a piercing assembly for alignment with the cells of the material for piercing a sheet of thermoplastic adhesive covering the ends of the cells of the material, for piercing the adhesive substantially in the center of each cell.

2. An apparatus according to claim 1 wherein the base has a plurality of parallel longitudinal slots and wherein the projecting members are positioned along straight lines extending in the longitudinal direction so that the projecting members extend through the longitudinal slots.

3. An apparatus according to claim 2 wherein at least some of the projecting members of each row have associated therewith locating lugs which are a sliding fit within the associated slots.

4. An apparatus according to claim 2 wherein the base is provided with a lateral row of fixed projections extending therefrom, each fixed projection comprising a location for a corresponding cell of the sheet of open celled reticular material.

5. An apparatus according to claim 1 wherein the base has a pair of parallel longitudinal guides, the rows of projecting members being restrained between the guides.

6. An apparatus according to claim 5 wherein the projecting members are positioned along straight lines extending in the longitudinal direction.

7. An apparatus according to claim 1 wherein each row of projecting members comprises a corresponding bar from which the projecting members project.

8. An apparatus according to claim 1 wherein the piercing assembly includes a movable piercing head carrying a plurality of piercing members arranged on the piercing head, the jig being mounted on the piercing assembly for stepped movement relatively thereto to any one of a number of positions in which the cells of the material are aligned with the piercing head, the piercing head being movable, in any one of the positions, into and out of an operative disposition in which the piercing members each enter a corresponding cell of the material substantially in the center of the cell to pierce a sheet of thermoplastic adhesive covering the ends of the cells.

9. An apparatus according to claim 8 wherein the jig is held in any one of the number of positions by releasable detent means which engages between adjacent rows of projecting members to align the cells of the material and the piercing head.

10. An apparatus according to claim 9 wherein the piercing head is mounted on a pair of parallel guides for sliding movement relatively thereto towards and away from the jig.

11. An apparatus according to claim 1 wherein the piercing assembly includes a movable piercing head carrying a plurality of piercing members arranged on the piercing head, the piercing assembly being movable relatively to the jig to any one of a number of positions in which the piercing head is aligned with the cells of the material and in which the piercing head is movable into and out of an operative disposition in which the piercing members each enter a corresponding cell of the material substantially in the center of the cell to pierce a sheet of thermoplastic adhesive covering the ends of the cells.

12. An apparatus according to claim 11 wherein the rows of projecting members each include a corresponding pair of locating holes and the piercing assembly includes a pair of guide posts having lugs for location in the holes of a row of projecting members to align the piercing head with the cells of the material.

13. An apparatus according to claim 12 wherein the piercing head is slidable on the guide posts and is movable away from a datum position with respect to the posts against the action of a spring, the datum position of the piercing head, when the guide posts are located in the holes, being out of operative disposition.

* * * * *